United States Patent Office 3,248,423
Patented Apr. 26, 1966

3,248,423
PROCESS FOR PREPARING ALKYL SULFONYL CHLORIDES
George B. Stratton, Lewiston, N.Y., assignor to Hooker Chemical Corporation, Niagara Falls, N.Y., a corporation of New York
No Drawing. Filed Nov. 30, 1962, Ser. No. 241,143
6 Claims. (Cl. 260—543)

This invention relates to a method of preparing alkyl sulfonyl chlorides. More particularly, it relates to a method of producing alkyl sulfonyl chlorides with decreased content of compounds in which the alkyl chain has been chlorinated.

Alkyl sulfonyl chlorides may be prepared by reacting a mercaptan with chlorine gas according to the following equation:

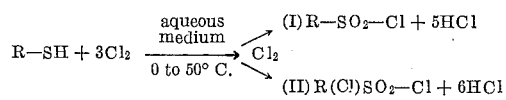

Disulfides of the formula R—S—S—R' where R and R' are alkyl radicals, usually of up to 20 carbon atoms and preferably of 4 to 20 carbon atoms may also be employed in the above reaction instead of the mercaptan. Both of these classes of reactants are within the designation R—S—Y, wherein Y is hydrogen or a radical of the formula —S—R' wherein R' is an alkyl group, and R is an alkyl group.

It is therefore an object of this invention to increase the yield of product (I) and at the same time to decrease the proportion of product of (II) made. Other objects will become apparent from a consideration of the detailed specification which follows.

Alkyl sulfonyl chlorides are useful as chemical intermediates in the preparation of materials for treating textiles, and the presence of chlorine in the R group or chain, as in (II) above, sometimes interferes with the subsequent treatment of the chain, and for this reason is undesirable.

The objects of the invention are accomplished by carrying out the reaction of the above indicated equation in the presence of oxygen mixed with the reactant materials, preferably, with chlorine. The oxygen employed may be the substantially pure gas, in air, or with another diluent gas which does not interfere with the present reaction. It is blended with a material stream prior to reaction but may also be introduced into the reaction mixture in solution or in a combined form. It is required only to be releasable or available to minimize chain chlorination of the mercaptan or disulfide during the reactions being effected.

In the preparation of alkyl sulfonyl chlorides according to the present invention, the mercaptan or disulfide is selected according to the chain length desired in the sulfonyl chloride and is led into a reaction vessel along with an aqueous medium, in which it is mixed, preferably by means of an agitator, to form a slurry, emulsion or suspension, the reaction mixture is kept agitated, a quantity of hydrochloric acid added to the reaction mixture if desired, after which chlorine gas, together with air or other source of oxygen, is introduced into the slurry or reaction mixture. The temperature of the slurry is kept between about 0° and about 30 degrees centigrade and is controlled with suitable cooling means.

The reaction is carried on until a slight excess of chlorine has been introduced, whereupon the flow of chlorine is stopped and the slurry is agitated until it is no longer yellow.

It has now been discovered that a small proportion of oxygen, e.g., about 0.05 to 5 percent of the chlorine stream which is introduced into the mercaptan slurry significantly decreases the production of alkyl sulfonyl chloride with chlorine in the chain. Although oxygen is preferably brought into the reaction mixture by mixing air with the chlorine feed stock, it may also be added to or incorporated into the reaction mixture in other suitable ways.

So that invention of this application may be more readily understood by those skilled in the art, the following examples are given by way of illustration and should not be construed as limiting the invention. All parts are by weight and all temperatures are in degrees centigrade, unless otherwise indicated.

EXAMPLE 1

Preparation of n-octyl sulfonyl chloride (chlorinating with chlorine air blend)

One and one-half moles of normal octyl mercaptan and 750 milliliters of water were introduced into a two-liter creased flask and slurried together by means of a mechanical stirrer. When a uniform slurry was made, a small stream of chlorine gas containing about one percent by weight of air was bubbled through the slurry slowly. During a period of three hours and twenty-five minutes a total of 330 grams of chlorine gas was introduced into the flask which was kept at a temperature of about 10 degrees centigrade. Such amount is calculated to be about 15 grams more than the theoretical amount of $Cl_2$ necessary to react with the mercaptan. Then the flow of chlorine containing about 1 percent air was stopped, and agitation of the reaction mixture was continued for an additional hour and twenty-five minutes in order to complete the reaction. At that time the product was separated, put under vacuum to dry and to remove excess $Cl_2$, and thereafter was further dried by cold mixing with anhydrous sodium carbonate. The sodium carbonate which also had the effect of removing the last traces of hydrogen chloride and stabilizing the product, was later filtered off. A clear, water-white oil was the final product, which has a specific gravity of 1.081. This dried oil was obtained in 97 percent yield and was 91.2 percent pure. A similar procedure may be followed with dodecyl and other mercaptans of 4 to 20 carbon atoms, e.g., mercaptans of 8 to 12 carbon atoms.

EXAMPLE 2

Preparation of n-octyl sulfonyl chloride (control chlorination with chlorine)

By the procedure as that of Example 1, except for omission of the air in the chlorine stream, n-octyl sulfonyl chloride was made from n-octyl mercaptan. The product resulting had a higher content of $R(Cl)SO_2Cl$ than that of Example 1 and a smaller yield of the desired $RSO_2Cl$ was obtained.

The products of Examples 1 and 2 were compared by conversion to the corresponding fluorides by reacting them with about a 50 percent excess of a concentrated solution of a water-soluble fluoride salt, e.g., potassium fluoride, in an aqueous medium at above 100 degrees centigrade, after which the fluoride compounds were analyzed. (Analysis is facilitated by such conversion and the results are significant, too, because the fluorides are preferred forms of alkyl sulfonyl halides in commerce.)

|  | Typical Comparative Analyses (Percent) | |
| --- | --- | --- |
|  | Example I, Product Derivative | Example II, Product Derivative |
| n-Octyl $SO_2F$ | 95.2 | 86.3 |
| n-Octyl (Cl)$SO_2F$ | 2.8 | 9.7 |
| n-Octyl $SO_2Cl$ | 0.1 | 0.1 |
| Total Analyzable | 98.1 | 97.0 |

It is readily apparent from a comparison of the two product analyses that there is only about one-third as much undesirable n-octyl (Cl)—$SO_2$—F produced when air or oxygen is used according to this invention, and the yield of n-octyl —$SO_2$—F is significantly improved.

While the preferred embodiments of this invention have been described in detail, the invention may be practiced in chlorinating mercaptans generally but preferably is best applicable to those mercaptans having from about four to about twenty carbon atoms and more preferably to those having a straight chain.

The present process is also operable with disulfides of the formula:

$$R—S—S—R'$$

where R and R' are the same or different, but preferably the same alkyl radicals of up to twenty carbon atoms. The treatment breaks the S—S linkage and oxidizes and chlorinates each sulfur atom to produce the desired sulfonyl chloride.

The proportion of oxygen present in the reaction mixture, calculated on the basis of the chlorine feed and usually in intimate mixture therewith, is preferably 0.01 or 0.05 to 5 percent, most preferably about 0.1 to 1 percent by weight. Such small proportions of oxygen have been found to be very effective in producing the desired products. To compute the proportion of air to employ, the above proportions may be multiplied by 5.

Reaction temperatures for the chlorination steps described are preferably from about 0 degrees to thirty degrees centigrade, but other temperatures at which chlorination occurs at an acceptable rate to produce the desired product may also be employed, e.g., minus 10 degrees to 70 degrees centigrade. The time of reaction may also be regulated to produce an acceptable product at a commercial rate. Usually the addition of chlorine will take place over a period of one-half hour to eight hours or even longer on a large scale, and after addition the reaction will be allowed to continue for 1–4 hours.

The alkyl sulfonyl chlorides made by the inventive process are substantially free of chain chlorination, usually being over eighty-five percent and preferably over 90 percent pure. One is thus enabled to make a sulfonyl fluoride of over 90 percent purity and a product of purity greater than 95 percent is obtainable by reacting the sulfonyl chloride with a suitable soluble fluoride.

To make the alkyl sulfonyl fluoride described above, one reacts the alkyl sulfonyl chloride in excess proportions with a source of soluble fluoride such as a soluble alkali metal salt thereof, e.g., sodium fluoride, potassium fluoride. Up to a 50 percent excess of the fluoride may be desirable in some instances. The source of fluoride is usually present in concentrated solution in water. The reaction temperature is normally within the range of 100 to 105 degrees centigrade, preferably about 100 degrees centigrade and the reaction time may be from about ¼ to 24 hours, depending on the materials employed and the degree of conversion to fluoride required. In specific cases, reaction temperatures and times may be altered so as to obtain most desirable production results.

From the foregoing it is apparent that applicants have invented a method which significantly increases the yield of alkyl sulfonyl chlorides made by chlorinating mercaptans and disulfides and allows the improved production of the corresponding fluorides from them. The discovery is readily applicable to commercial methods of making alkyl sulfonyl halides and significantly improves such products without requiring major operational equipment changes or the employment of any costly reagents or solvents.

The invention has been described with respect to preferred embodiments thereof but it should be clear that variations may be made therein and equivalents may be substituted without going beyond the purview of the invention of transcending the scope of the claims.

What is claimed is:

1. A process for the batch preparation of an alkyl sulfonyl chloride of four to twenty carbon atoms which comprises chlorinating R—S—Y, wherein Y is selected from the group consisting of hydrogen and —S—R' and R and R' are alkyl groups of four to twenty carbon atoms, by bubbling through R—S—Y in aqueous medium at a temperature between about −10 degrees and 70 degrees centigrade, chlorine containing from 0.05 to 5 percent of oxygen to inhibit undesirable chlorination of the alkyl group of the alkyl sulfonyl chloride.

2. A process according to claim 1 in which the compound chlorinated is RSH wherein R is an alkyl group of 8 to 12 carbon atoms, and the temperature of the aqueous medium is between about 0 degrees and 30 degrees centigrade.

3. A process according to claim 1 in which the compound chlorinated is R—S—S—R' and the temperature of the aqueous medium is between about 0 degrees and 30 degrees centigrade.

4. A process according to claim 2 in which the mercaptan forms a slurry with the aqueous medium.

5. The process of claim 2 in which the oxygen is present in the chlorine as air.

6. A process for the batch preparation of normal octyl sulfonyl chloride which comprises chlorinating normal octyl mercaptan by bubbling through said mercaptan in an aqueous medium at a temperature between about 0 degrees and 30 degrees centigrade, chlorine containing from 0.05 to 5 percent of oxygen to inhibit undesirable chlorination of the alkyl group of the octyl sulfonyl chloride.

References Cited by the Examiner

UNITED STATES PATENTS

| 2,276,097 | 3/1942 | Salzberg | 260—543 |
| 2,277,325 | 3/1942 | Hueter et al. | 260—543 |
| 2,573,674 | 11/1951 | Adams et al. | 260—543 |
| 2,598,013 | 5/1952 | Proell et al. | 260—543 |
| 2,598,014 | 5/1952 | Proell et al. | 260—543 |

OTHER REFERENCES

Houben-Weyl: Methoden der Organischen Chemie, vol. 9, 1955, pp. 392–394.

LORRAINE A. WEINBERGER, *Primary Examiner.*

LEON ZITVER, *Examiner.*